(12) United States Patent
Massicotte et al.

(10) Patent No.: US 11,719,120 B2
(45) Date of Patent: Aug. 8, 2023

(54) VACUUM TESTING A SEAL WITHIN A GAS TURBINE ENGINE STRUCTURE

(71) Applicant: Pratt & Whitney Canada Corp., Longueuil (CA)

(72) Inventors: Francois Massicotte, Laval (CA); Maxime Desgagne, Longueuil (CA); Frederic Deschenes, Bromont (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/562,434

(22) Filed: Dec. 27, 2021

(65) Prior Publication Data
US 2023/0203964 A1 Jun. 29, 2023

(51) Int. Cl.
*F01D 21/00* (2006.01)
*F01D 11/00* (2006.01)

(52) U.S. Cl.
CPC .......... *F01D 21/003* (2013.01); *F01D 11/005* (2013.01); *F05D 2220/32* (2013.01); *F05D 2240/55* (2013.01); *F05D 2260/83* (2013.01)

(58) Field of Classification Search
CPC ...... G01M 3/2869; G01M 3/02; G01M 3/025; G01M 15/14; G01M 13/005; F01D 21/003; F01D 11/005; F05D 2220/32; F05D 2240/55; F05D 2260/83
See application file for complete search history.

(56) References Cited

U.S. PATENT DOCUMENTS

| | | | | |
|---|---|---|---|---|
| 5,372,031 | A * | 12/1994 | Harmand | G01M 3/025 73/45.4 |
| 10,302,523 | B2 | 5/2019 | Huppe | |
| 10,502,083 | B2 | 12/2019 | Leutard | |
| 11,149,640 | B2 * | 10/2021 | Freeman | F01D 25/183 |
| 2013/0321000 | A1 * | 12/2013 | Andarawis | G01B 7/14 324/658 |
| 2016/0238480 | A1 * | 8/2016 | Socha | G01M 3/025 |
| 2017/0152754 | A1 * | 6/2017 | Leutard | F01D 25/166 |
| 2020/0300723 | A1 * | 9/2020 | Pergantis | G01M 3/3272 |
| 2021/0079842 | A1 * | 3/2021 | Freeman | F02C 7/06 |

FOREIGN PATENT DOCUMENTS

| CN | 107340101 B | 9/2020 | |
|---|---|---|---|
| FR | 3051907 A1 * | 12/2017 | ............. F01D 11/00 |
| KR | 20170104222 A * | 9/2017 | |

OTHER PUBLICATIONS

RelentlessRacing. How to Check Valve Seats with a Vacuum Gauge. May 16, 2020. https://www.youtube.com/watch?v=h4XdJ-P0Rdc (Year: 2020).*
EP search report for EP22215976.6 dated Jun. 2, 2023.

* cited by examiner

*Primary Examiner* — Topaz L. Elliott
(74) *Attorney, Agent, or Firm* — Getz Balich LLC (57) ABSTRACT

A method is provided for testing an annular seal within a gas turbine engine. During this method, a vacuum is applied to a first volume through a conduit. The annular seal is between the first volume and a second volume. A vacuum pressure is measured within the conduit while the vacuum is applied. The measured vacuum pressure is compared to a threshold vacuum pressure. A difference between the measured vacuum pressure and the threshold vacuum pressure is indicative of leakage across the annular seal from the second volume to the first volume.

17 Claims, 6 Drawing Sheets

FIG. 6 ic field, variables with subscripts—

VACUUM TESTING A SEAL WITHIN A GAS TURBINE ENGINE STRUCTURE

TECHNICAL FIELD

This disclosure relates generally to a gas turbine engine and, more particularly, to testing a seal of the gas turbine engine.

BACKGROUND INFORMATION

A gas turbine engine includes seals for separating different cavities within the gas turbine engine. The condition of each of these seals may affect gas turbine engine operation and/or efficiency. Various methods are known in the art for testing the condition of a seal. While these known testing methods have various benefits, there is still room in the art for improvement. There is a need in the art therefore for improve methods and systems for testing a condition and/or an effectiveness of a seal.

SUMMARY

According to an aspect of the present disclosure, a method is provided for testing an annular seal within a gas turbine engine. During this method, a vacuum is applied to a first volume through a conduit. The annular seal is between the first volume and a second volume. A vacuum pressure is measured within the conduit while the vacuum is applied. The measured vacuum pressure is compared to a threshold vacuum pressure. A difference between the measured vacuum pressure and the threshold vacuum pressure is indicative of leakage across the annular seal from the second volume to the first volume.

According to another aspect of the present disclosure, another method is provided for testing an annular seal of a gas turbine engine. During this method, a structure is provided for the gas turbine engine. The annular seal is arranged in situ within and part of the structure. The annular seal is configured between a first volume and a second volume. Gas is flowed across the annular seal from the second volume to the first volume and into a conduit. A pressure of the gas within the conduit is measured while the gas is flowing across the annular seal. The measured pressure is compared to a threshold pressure. A difference between the measured pressure and a threshold pressure is indicative of leakage across the annular seal from the second volume to the first volume.

According to still another aspect of the present disclosure, a system is provided for testing an annular seal arranged in situ within a structure of a gas turbine engine. This system includes a tool, a conduit, a vacuum pump and a pressure measurement device. The tool is configured to form a first volume with the structure. The annular seal is between the first volume and a second volume within the structure. The conduit is fluidly coupled with the first volume through the tool. The vacuum pump is fluidly coupled with the conduit. The vacuum pump is configured to draw gas across the annular seal from the second volume to the first volume and into the conduit. The pressure measurement device is configured to measure a vacuum pressure within the conduit when the vacuum pump draws the gas across the annular seal from the second volume to the first volume and into the conduit. A difference between the measured vacuum pressure and the threshold vacuum pressure is indicative of leakage across the annular seal from the second volume to the first volume.

The system may also include a compressed gas source fluidly coupled with the vacuum pump. The vacuum pump may be operated by compressed gas received from the compressed gas source.

The tool may extend circumferentially about an axis. The tool may include a base, an inner flange and an outer flange. The inner flange may be connected to an inner end of the base. The inner flange may be configured to axially overlap and seal against the structure. The outer flange may be connected to an outer end of the base. The outer flange may be configured to axially overlap and seal against the structure.

A vacuum may be applied to the first volume through the conduit to draw the gas across the annular seal from the second volume to the first volume.

The first volume may be adjacent and outside of the structure. The second volume may be within the structure.

A condition of the annular seal may be evaluated based on the comparison of the measured pressure to the threshold pressure.

The annular seal may be determined to satisfy a specification where the measured vacuum pressure is less than the threshold vacuum pressure.

The annular seal may be determined not to satisfy a specification where the measured vacuum pressure is greater than the threshold vacuum pressure.

A tool may be mounted to a structure of the gas turbine engine. The first volume may be between and/or may be formed by the tool and the structure. The conduit may be connected to the first volume through the tool.

The first volume may extend axially between the tool and the structure.

The first volume may extend radially between the tool and the structure.

The structure may be configured as or otherwise include a rotor disk.

The structure may be configured as or otherwise include a shaft nut.

The tool may extend circumferentially about an axis. The tool may include a base, an inner flange and an outer flange. The base may extend radially between the inner flange and the outer flange. The inner flange may project axially out from the base. The inner flange may be radially inboard of and/or may axially overlap the structure. The outer flange may project axially out from the base. The outer flange may be radially outboard of and/or may axially overlap the structure.

The vacuum may be applied by a vacuum pump.

The vacuum pump may be operated using compressed air.

The vacuum pressure may be measured at a location outside of the gas turbine engine between the first volume and the vacuum pump.

The annular seal may be installed within the gas turbine engine and/or may be ready for operation of the gas turbine engine during the applying of the vacuum and the measuring of the vacuum pressure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
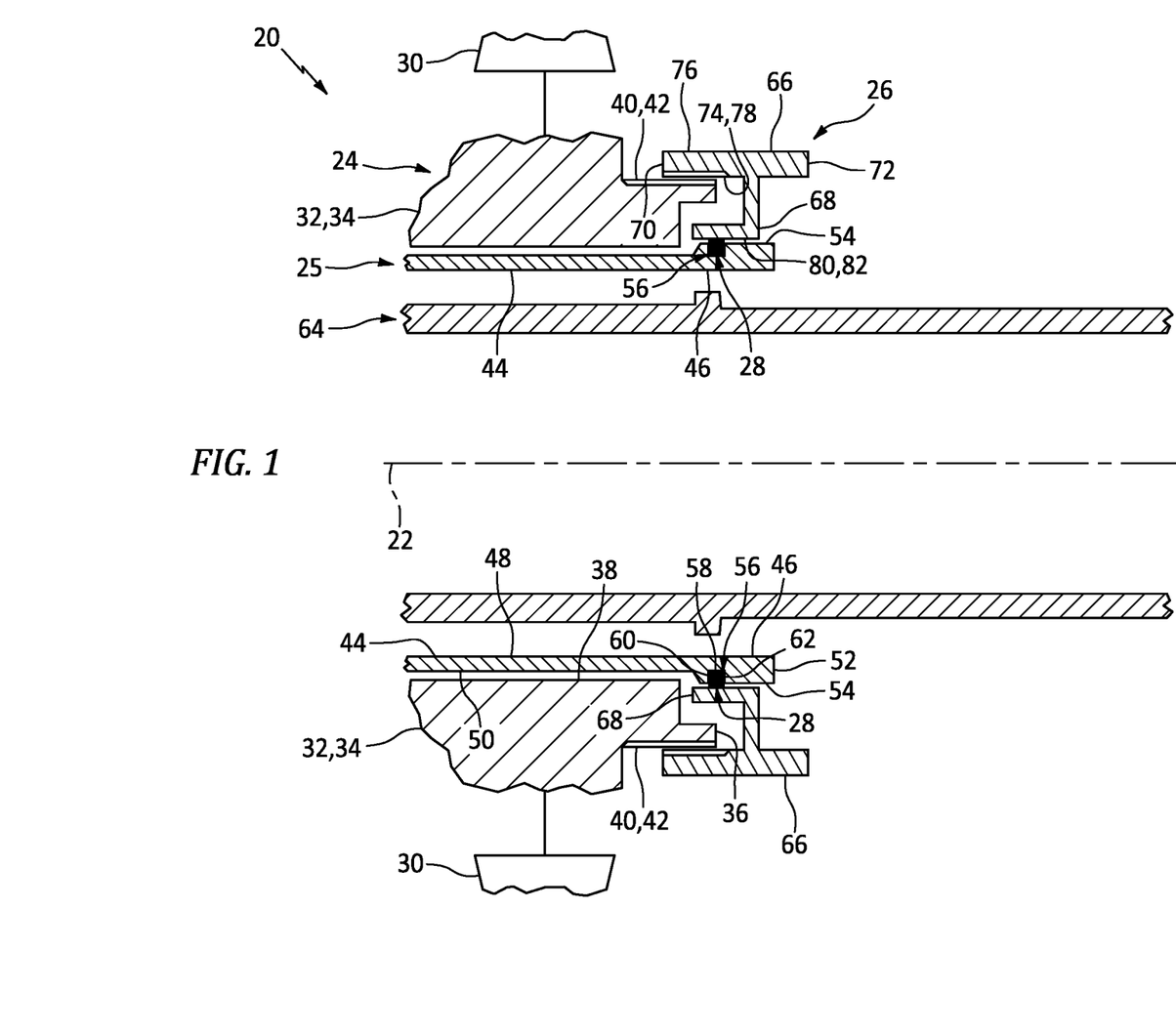
FIG. 1 is a sectional illustration of a portion of a rotating structure for a gas turbine engine.

FIG. 1 illustrates a portion of a rotating structure 20 of a gas turbine engine; e.g., an engine spool assembly. This rotating structure 20 is rotatable about a rotational axis 22, which rotational axis 22 may also be an axial centerline of the gas turbine engine. The rotating structure 20 of FIG. 1 includes a bladed rotor 24, a first engine component 25 and a second engine component 26. This rotating structure 20 of FIG. 1 also includes a seal 28 configured to seal a (e.g., annular) gap between the first engine component 25 and the second engine component 26.

The bladed rotor 24 may be configured as a compressor rotor or a turbine rotor within the gas turbine engine. The bladed rotor 24 of FIG. 1, for example, includes a plurality of rotor blades 30 and at least one rotor disk 32. The rotor blades 30 are distributed circumferentially around an outer periphery of the rotor disk 32. The rotor blades 30 are connected to the rotor disk 32. The rotor blades 30, for example, may be formed integral with the rotor disk 32, or mechanically fastened, welded, brazed, adhered and/or otherwise attached to the rotor disk 32.

The rotor disk 32 of FIG. 1 includes a disk hub 34. This disk hub 34 extends axially along the rotational axis 22 to an axial end 36 of the bladed rotor 24 and its disk hub 34. The disk hub 34 extends circumferentially about (e.g., completely around) the rotational axis 22. The disk hub 34 extends radially between and to an inner side 38 of the bladed rotor 24 and its disk hub 34 and an outer side 40 of the disk hub 34. The disk hub 34 of FIG. 1 is configured with outer threads 42 (schematically shown in FIG. 1) along at least a portion of the hub outer side 40 at (e.g., on, adjacent or proximate) the rotor end 36.

The first engine component 25 may be configured as an inner nut for the rotating structure 20. The first engine component 25 of FIG. 1 includes a tubular member 44 (e.g., an extension, a sleeve, etc.) and an inner seal land 46. The tubular member 44 extends axially along the rotational axis 22. The tubular member 44 extends circumferentially about (e.g., completely around) the rotational axis 22. The tubular member 44 extends radially between and to an inner side 48 of the first engine component 25 and its members 44 and 46 and an outer side 50 of the tubular member 44.

The inner seal land 46 is connected to (e.g., formed integral with) the tubular member 44. The inner seal land 46 projects axially along the rotational axis 22 out from the tubular member 44 to an axial end 52 of the first engine component 25 and its inner seal land 46. The inner seal land 46 extends circumferentially about (e.g., completely around) the rotational axis 22. The inner seal land 46 extends radially between and to component inner side 48 and an outer side 54 of the inner seal land 46. The inner seal land 46 of FIG. 1 includes a seal receptacle 56 (e.g., a groove) configured to receive the seal 28. This seal receptacle 56 extends radially into the inner seal land 46 from the land outer side 54 to a radial side 58 of the seal receptacle 56. The seal receptacle 56 extends circumferentially about (e.g., completely around) the rotational axis 22 within the inner seal land 46. The seal receptacle 56 extends axially along the rotational axis 22 within the inner seal land 46 between opposing axial ends 60 and 62 of the seal receptacle 56.

The first engine component 25 is mated with the bladed rotor 24. The first engine component 25 of FIG. 1, for example, is received within (e.g., extends axially within) an inner bore of the bladed rotor 24. The inner seal land 46 of FIG. 1 projects out of the inner bore to its inner seal land end 52. An inner bore of the first engine component 25 may receive another component 64 of the rotating structure 20 or another rotating structure of the gas turbine engine. The component 64 of FIG. 1 is configured as an engine shaft that projects axially along the rotational axis 22 through the inner bore of the first engine component 25.

The second engine component 26 may be configured as an outer nut for the rotating structure 20. The second engine component 26 of FIG. 1, for example, includes a component base 66 and an outer seal land 68. The component base 66 extends axially along the rotational axis 22 between opposing axial ends 70 and 72 of the second engine component 26 and its component base 66. The component base 66 extends circumferentially about (e.g., completely around) the rotational axis 22. The component base 66 extends radially between and to an inner side 74 of the component base 66 and an outer side 76 of the second engine component 26 and its component base 66. The component base 66 of FIG. 1 is configured with inner threads 78 (schematically shown in FIG. 1) along at least a portion of the base inner side 74 at (e.g., on, adjacent or proximate) the component end 70.

The outer seal land 68 is connected to (e.g., formed integral with) the component base 66. The outer seal land 68 projects radially inward from the component base 66 to an inner side 80 of the second engine component 26 and a radial distal end 82 of the outer seal land 68. This outer seal land 68 extends axially along the rotational axis 22 (at the distal end 82) between opposing axial sides of the outer seal land 68. The outer seal land 68 extends circumferentially about (e.g., completely around) the rotational axis 22.

The second engine component 26 is mated with the bladed rotor 24 and the first engine component 25. The component base 66 of FIG. 1, for example, is mounted (e.g., threaded) onto the disk hub 34 where the inner threads 78 engage the outer threads 42. The inner seal land 46 is received within (e.g., extends axially within) an inner bore of the second engine component 26 and its outer seal land 68. The seal receptacle 56 is axially aligned with a (e.g., cylindrical) inner surface of the outer seal land 68 at component inner side 80. The component inner side 80 is radially spaced from the component outer side 54 by a (e.g., annular) radial gap.

The seal 28 may be configured as an annular seal element (e.g., a piston seal, a ring seal, etc.) or an annular seal assembly. The seal 28 extends circumferentially about (e.g., completely around) the rotational axis 22. The seal 28 is mounted to the first engine component 25 radially between the inner seal land 46 and the outer seal land 68. The seal 28 of FIG. 1, for example, is seated within the seal receptacle 56, and the seal 28 is sealingly engaged with (e.g., radially contacts) the inner surface of the outer seal land 68 and is sealingly engaged with (e.g., axially contacts) a (e.g., annular) side surface of the inner seal land 46 at one of the receptacle sides 60, 62. The seal 28 may thereby substantially (or completely) seal the gap between the first engine component 25 and the second engine component 26.

Figure 2:
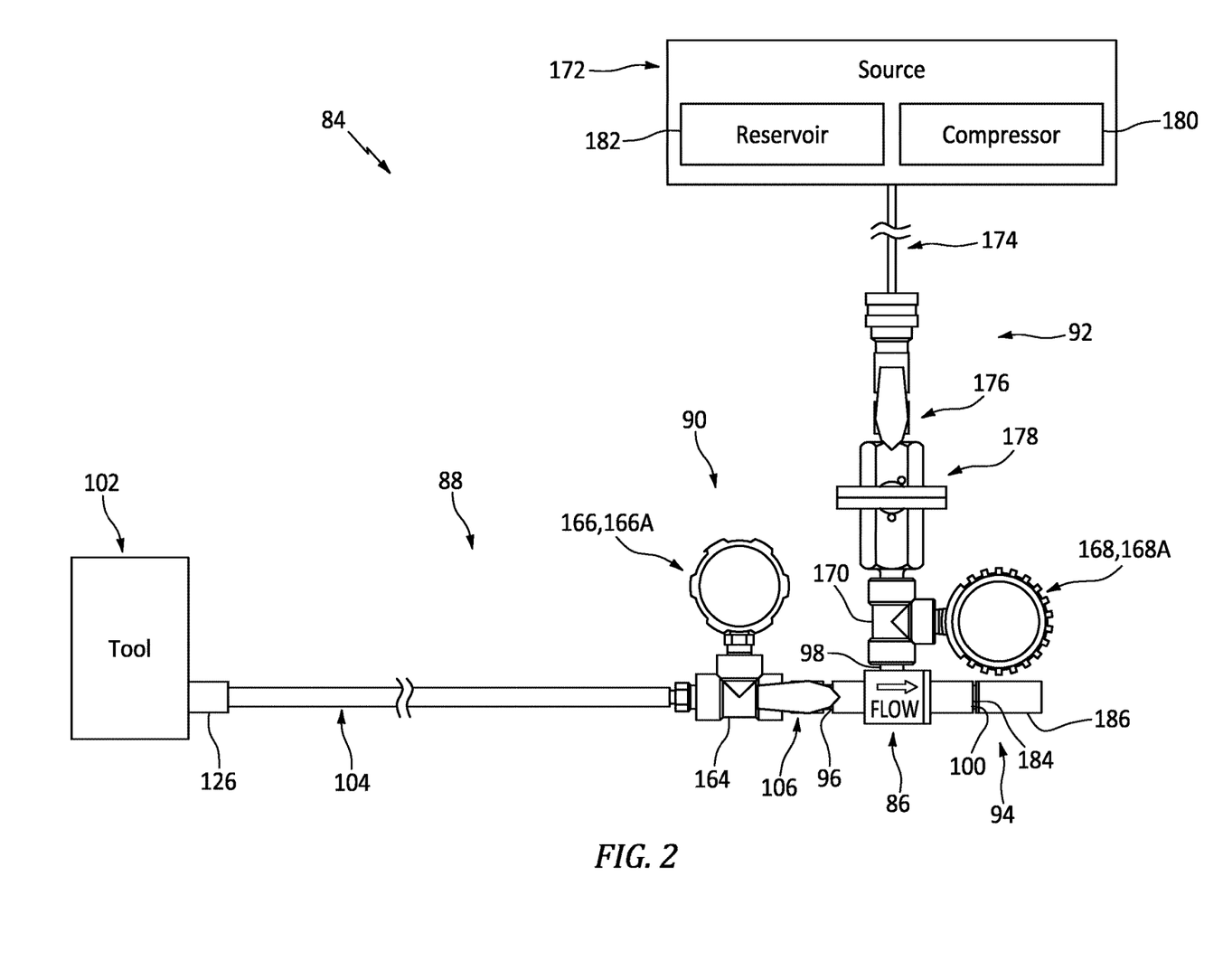
FIG. 2 is an illustration of a system for testing a seal and/or a seal interface.

Following assembly of the rotating structure 20 (e.g., during a manufacturing inspection process, following use of the gas turbine engine or otherwise), the seal 28 may be tested to evaluate a condition of seal 28 and/or an effectiveness of the seal interface between the first engine component 25 and the second engine component 26. FIG. 2 illustrates a system 84 which may be used for testing the seal 28 of FIG. 1 (or other seals) during such an evaluation. This testing system 84 includes a vacuum pump 86, a vacuum circuit 88 and a measurement system 90. The testing system 84 of FIG. 2 also includes a compressed gas circuit 92 and an exhaust circuit 94.

The vacuum pump 86 is configured to generate suction at a vacuum inlet 96. The vacuum pump 86 may be configured as a venturi pump operable to generate suction by flowing compressed gas (e.g., compressed air) therethrough. The vacuum pump 86 of FIG. 2 includes the vacuum inlet 96, a compressed gas inlet 98 and an exhaust outlet 100.

The vacuum circuit 88 includes a vacuum tool 102 and a vacuum conduit 104. The vacuum circuit 88 of FIG. 2 also includes a vacuum circuit valve 106; e.g., a shutoff valve.

Figure 3:
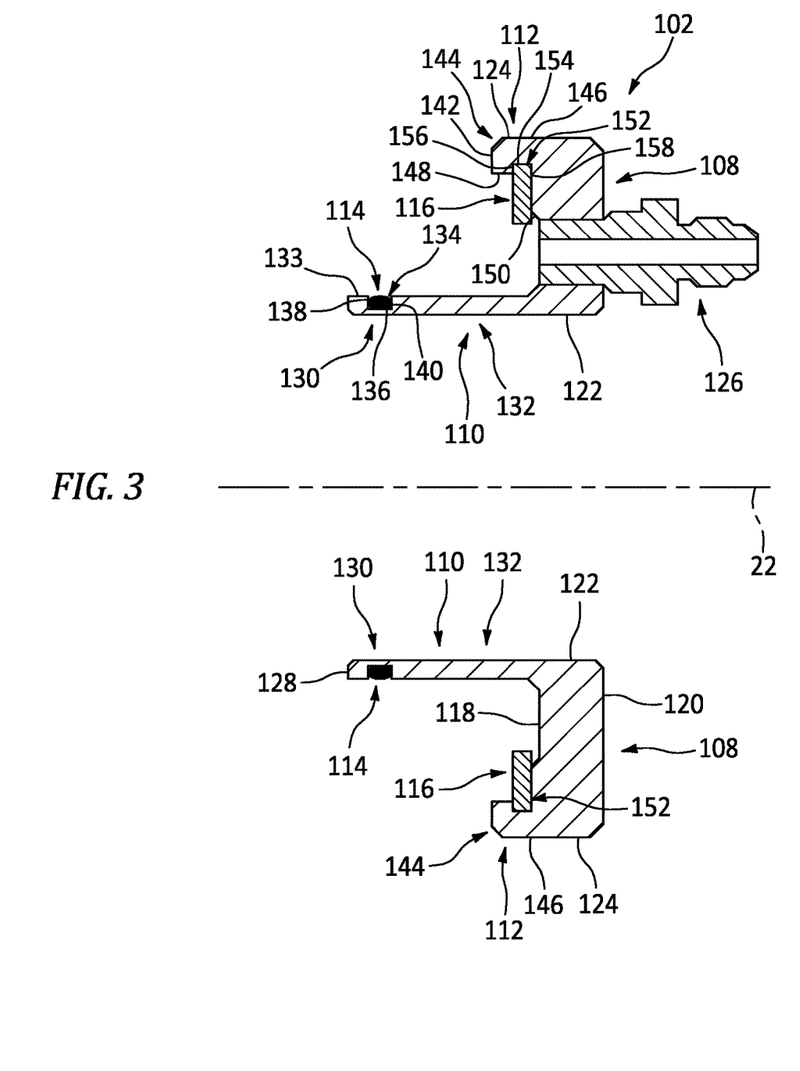
FIG. 3 is a sectional illustration of a tool for the testing system.

Referring to FIG. 3, the vacuum tool 102 is configured as an annular cap and/or plug. The vacuum tool 102 of FIG. 3, for example, includes a tool base 108, one or more tool flanges 110 and 112 and one or more seals 114 and 116; e.g., annular seal elements.

The tool base 108 extends axially along the rotational axis 22 between and to an interior end 118 of the tool base 108 and an exterior end 120 of the vacuum tool 102. The tool base 108 extends circumferentially about (e.g., completely around) the rotational axis 22. The tool base 108 extends radially between and to an inner side 122 of the vacuum tool 102 and an outer side 124 of the vacuum tool 102. The tool base 108 of FIG. 3 includes a conduit adaptor 126; e.g., a quick release nipple.

The tool inner flange 110 is connected to (e.g., formed integral with) the tool base 108 at the tool inner side 122. The tool inner flange 110 projects axially out from the tool base 108 along the rotational axis 22 to an interior end 128 of the vacuum tool 102. The tool inner flange 110 extends circumferentially about (e.g., completely around) the rotational axis 22. This tool inner flange 110 includes an (e.g., annular) inner flange seal land 130 at the tool interior end 128. The inner flange seal land 130 of FIG. 3, for example, projects axially out from an intermediate member 132 of the tool inner flange 110 along the rotational axis 22 to the tool interior end 128. This inner flange seal land 130 extends radially between and to the tool inner side 122 and an outer side 133 of the inner flange seal land 130. The inner flange seal land 130 of FIG. 3 includes an inner flange seal receptacle 134 (e.g., a groove) configured to receive the tool inner seal 114. This inner flange seal receptacle 134 extends radially into the inner flange seal land 130 from the land outer side 133 to a radial side 136 of the inner flange seal receptacle 134. The inner flange seal receptacle 134 extends circumferentially about (e.g., completely around) the rotational axis 22 within the inner flange seal land 130. The inner flange seal receptacle 134 extends axially along the rotational axis 22 within the inner flange seal land 130 between opposing axial ends 138 and 140 of the inner flange seal receptacle 134.

The tool outer flange 112 is connected to (e.g., formed integral with) the tool base 108 at the tool outer side 124. The tool outer flange 112 projects axially out from the tool base 108 along the rotational axis 22 to an interior end 142 of the tool outer flange 112, which flange interior end 142 may be recessed axially from the tool interior end 128. The tool outer flange 112 extends circumferentially about (e.g., completely around) the rotational axis 22. The tool outer flange 112 includes a component seal land 144 (e.g., an annular rim) at the flange interior end 142. The component seal land 144 of FIG. 3, for example, projects axially out from an intermediate member 146 of the tool outer flange 112 along the rotational axis 22 to the flange interior end 142. This component seal land 144 extends radially between and to the tool outer side 124 and an inner side 148 of the component seal land 144, where the land inner side 148 is radially recessed outward from an inner side 150 of the intermediate member 146. The tool outer flange 112 also includes an outer flange seal receptacle 152 (e.g., a groove) configured to receive the tool outer seal 116. This outer flange seal receptacle 152 is disposed at an axial interface between the component seal land 144 and the intermediate member 146. The outer flange seal receptacle 152 extends radially into the component seal land 144 from the inner sides 148 and 150 to a radial side 154 of the outer flange seal receptacle 152. The outer flange seal receptacle 152 extends circumferentially about (e.g., completely around) the rotational axis 22 within the component seal land 144. The outer flange seal receptacle 152 extends axially along the rotational axis 22 within the component seal land 144 between opposing axial ends 156 and 158 of the outer flange seal receptacle 152.

The tool inner seal 114 extends circumferentially about (e.g., completely around) the rotational axis 22. The tool inner seal 114 is mounted to the tool inner flange 110. The tool inner seal 114 of FIG. 3, for example, is seated within the inner flange seal receptacle 134.

The tool outer seal 116 extends circumferentially about (e.g., completely around) the rotational axis 22. The tool outer seal 116 is mounted to the tool outer flange 112. The tool outer seal 116 of FIG. 3, for example, is seated within the outer flange seal receptacle 152.

Figure 4:
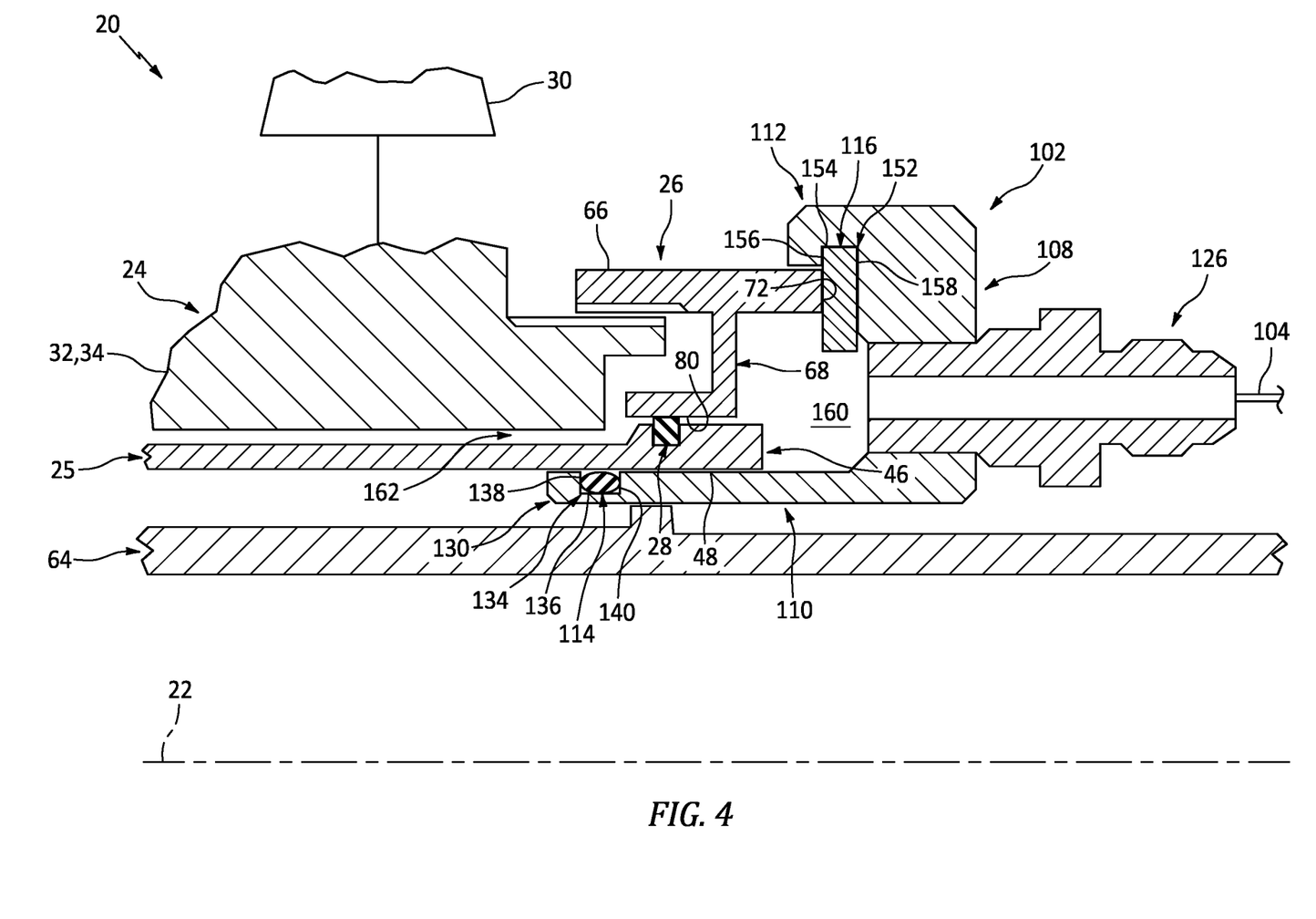
FIG. 4 is a partial sectional illustration of the tool mated with the rotating structure.

Referring to FIG. 4, the vacuum tool 102 is configured to mate with the rotating structure 20. The tool inner flange 110, for example, is received within (e.g., projects axially into) an inner bore of the inner seal land 46. The tool inner seal 114 is disposed radially between the inner flange seal land 130 and the inner seal land 46. More particularly, the tool inner seal 114 sealingly engages (e.g., radially contacts) a (e.g., cylindrical) outer surface of the tool inner flange 110 at the receptacle side 136 and a (e.g., cylindrical) inner surface of the inner seal land 46 at the side 48. The second engine component 26 is received (e.g., projects axially into) an inner counterbore of the component seal land 144. The tool outer seal 116 is disposed axially between the second engine component 26 and the tool outer flange 112. More particularly, the tool outer seal 116 sealingly engages (e.g., axially contacts) an (e.g., annular) end surface of the component base 66 at the base end 72 and an (e.g., annular) end surface of the tool outer flange 112 at the receptacle end 158.

With the foregoing arrangement, the vacuum tool 102 may form an enclosed exterior volume 160 (e.g., a cavity, a chamber, a plenum, etc.) with the rotating structure 20. This exterior volume 160 extends axially between the tool base 108 and the seal lands 46 and 68. The exterior volume 160 extends radially between the component base 66 and the tool inner flange 110, and radially between the inner seal land 46 and the tool inner flange 110. The seal 28 of FIG. 4 is between and is configured to substantially (or completely) fluidly separate (e.g., isolate, decouple, etc.) the exterior volume 160 from an enclosed interior volume 162 (e.g., a cavity, a chamber, a plenum, etc.) within the rotating structure 20 formed by and between, for example, the rotating structure components 24-26.

Referring to FIG. 2, the vacuum conduit 104 may be configured as or otherwise include a length of hose, pipe or any other type of tubing. The vacuum conduit 104 extends longitudinally between and is fluidly coupled with the vacuum tool 102 and the vacuum pump 86. A first end of the vacuum conduit 104 of FIG. 4, for example, is fluidly coupled with the conduit adaptor 126, which fluidly couples an internal passage of the vacuum conduit 104 with the exterior volume 160. A second end of the vacuum conduit 104 of FIG. 2 is fluidly coupled with the vacuum circuit valve 106 through an intermediate fitting 164. The vacuum circuit valve 106 is between and is fluidly coupled with the vacuum conduit 104 and, more particularly, the intermediate fitting 164 and the vacuum pump 86 and its vacuum inlet 96.

The measurement system 90 includes one or more pressure measurement devices 166 and 168. The vacuum circuit measurement device 166 is configured as a vacuum pressure gauge 166A. This vacuum pressure gauge 166A is configured to measure vacuum pressure within the vacuum circuit 88 and its vacuum conduit 104/the vacuum inlet 96. The vacuum pressure gauge 166A of FIG. 2, for example, is fluidly coupled with the intermediate fitting 164. The gas circuit measurement device 168 is configured as a compressed gas pressure gauge 168A. This gas pressure gauge 168A is configured to measure gas pressure within the compressed gas circuit 92/the compressed gas inlet 98. The gas pressure gauge 168A of FIG. 2, for example, is fluidly coupled with an intermediate fitting 170 in the compressed gas circuit 92. While these pressure measurement devices 166 and 168 are shown as analog devices in FIG. 2, one or more of these pressure measurement devices 166, 168 may alternatively be configured with digital sensors.

The compressed gas circuit 92 of FIG. 2 includes a compressed gas source 172 and a source conduit 174. The compressed gas circuit 92 of FIG. 2 also includes a compressed gas circuit valve 176 (e.g., a shutoff valve) and/or a compressed gas circuit flow regulator 178.

The compressed gas source 172 is configured to provide and contain compressed gas. The compressed gas source 172, for example, may include a compressor 180 (e.g., a pump) and a reservoir 182. The compressor 180 is configured to compress gas (e.g., air) and direct that compressed gas into the reservoir 182 for storage. The reservoir 182 may be configured as a tank, a cylinder or any other pressure vessel. An example of the compressed gas source 172 is a shop air source.

The source conduit 174 may be configured as or otherwise include a length of hose, pipe or any other type of tubing. The source conduit 174 extends longitudinally between and is fluidly coupled with the compressed gas source 172 and the vacuum pump 86. An end of the source conduit 174 of FIG. 2, for example, is fluidly coupled with the gas circuit valve 176. The gas circuit valve 176 is between and is fluidly coupled with source conduit 174 and the flow regulator 178. The flow regulator 178 is between and is fluidly coupled with the gas circuit valve 176 and the vacuum pump 86 and its compressed gas inlet 98 through the intermediate fitting 170.

The exhaust circuit 94 of FIG. 2 includes an exhaust conduit 184 and a muffler 186. The exhaust conduit 184 may be configured as or otherwise include a length of hose, pipe or any other type of tubing. The exhaust conduit 184 extends longitudinally between and is fluidly coupled with the muffler 186 and the vacuum pump 86 and its exhaust outlet 100.

The testing system 84 is described above with certain exemplary components and circuits. The testing system 84 of the present disclosure, however, is not limited to such an arrangement. For example, in some embodiments, one or more of the valves 106 and 176 may be omitted. In some embodiments, the muffler 186 may be omitted, or the conduit 184 between the muffler 186 and the vacuum pump 86 may be omitted. In some embodiments, the compressed gas circuit 92 may be omitted where the vacuum pump 86, for example, is configured as an electrically powered vacuum pump. In some embodiments, the vacuum tool 102 may have different configurations to mate with different rotating structures and/or to test seals in other locations of a gas turbine engine. For example, one or more of the vacuum tool flanges 110, 112 of FIG. 3 may be omitted to reconfigured.

Figure 5:
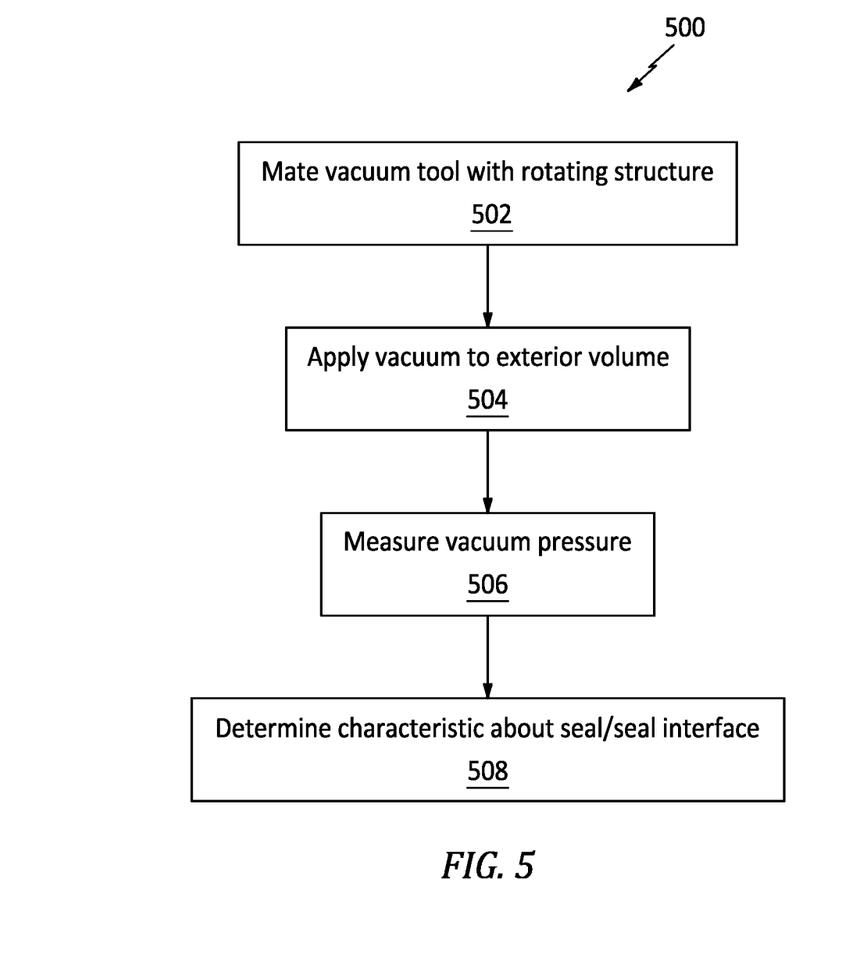
FIG. 5 is a flow diagram of a testing method.

FIG. 5 is a flow diagram of a method 500 for testing a seal such as the seal 28 of FIG. 1. For ease of description, this seal testing method 500 is described below with reference to the testing system 84 of FIG. 2. The seal testing method 500, however, may alternatively be performed with other testing system arrangements.

In step 502, the vacuum tool 102 is mated with the rotating structure 20.

In step 504, a vacuum is applied to the exterior volume 160. The compressed gas circuit 92, for example, may direct compressed gas from the compressed gas source 172 to the vacuum pump 86 through its compressed gas inlet 98. The flow regulator 178 may be set (or adjusted) such that the compressed gas received by the vacuum pump 86 at its compressed gas inlet 98 is at a predetermined compressed gas pressure. This compressed gas pressure may be less than (or equal to) a pressure of the compressed gas output by the compressed gas source 172. The compressed gas flows through the vacuum pump 86 (e.g., a venturi vacuum pump) to the exhaust outlet 100 to generate suction at the vacuum inlet 96 using known fluid principles. The compressed gas is subsequently exhausted from the testing system 84 through the exhaust circuit 94 and its muffler 186.

The suction at the vacuum inlet 96 draws gas (e.g., air) out of the exterior volume 160 through the vacuum circuit 88. This drawing of the gas applies a vacuum to the exterior volume 160 as well as the vacuum circuit 88. A pressure of the gas within the exterior volume 160 and the vacuum circuit 88, for example, is less than a pressure of ambient (e.g., room) air at standard atmosphere; e.g., 14.7 psi at sea level. The vacuum pressure of the gas within the exterior volume 160 and the vacuum circuit 88 may be expressed as a positive number (e.g., a number below 14.7 psi) or a negative number (e.g., a number to be subtracted from 14.7 psi). For ease of description, the vacuum pressure is expressed below as a positive number.

In step 506, the vacuum pressure within the vacuum circuit 88 and its vacuum conduit 104 is measured. This vacuum pressure (e.g., a gas pressure below 14.7 psi) may be measured using the vacuum pressure gauge 166A.

In step 508, the measured vacuum pressure is analyzed to determine a characteristic about the seal 28 and/or the seal interface between the first engine component 25 and the second engine component 26. The measured vacuum pressure, for example, may be compared to a predetermined threshold vacuum pressure. This threshold vacuum pressure may be related to a (e.g., acceptable) vacuum pressure that is expected to be measured within the vacuum circuit 88 and its vacuum conduit 104 when the seal 28 is configured and operating according to a specification; e.g., a design specification. The threshold vacuum pressure, for example, may be equal to an expected vacuum pressure with an allowable leakage factor. The expected vacuum pressure may be a pressure that is expected to be measured within the vacuum circuit 88 and its vacuum conduit 104 when the seal 28 is fully operational. The allowable leakage factor may be a vacuum pressure loss to account for a maximum allowable leakage flow across the seal 28 from the interior volume 162 to the exterior volume 160. For example, where (A) a pressure that is expected to be measured within the vacuum circuit 88 and its vacuum conduit 104 when the seal 28 is fully operational is X psi and (B) there can be at most Y psi leakage across the seal 28, then (C) the threshold vacuum pressure may be equal to (X+Y) psi; e.g., 4.7 psi+0.5 psi=5.2 psi. The present disclosure, of course, is not limited to the foregoing exemplary values.

Where the measured vacuum pressure (Z) is less than (or equal to) the threshold vacuum pressure (e.g., Z≤(X+Y)), it may be determined that the seal 28 and/or the seal interface between the first engine component 25 and the second engine component 26 satisfy the standard; e.g., the design standard. However, where the measured vacuum pressure is greater than the threshold vacuum pressure (e.g., Z>(X+Y)), it may be determined that the seal 28 and/or the seal interface between the first engine component 25 and the second engine component 26 do not satisfy the standard; e.g., the design standard. The seal testing method 500 may thereby facilitate testing of the seal 28 and/or the seal interface between the first engine component 25 and the second engine component 26 while the seal 28 is in situ; e.g., while the rotating structure 20 is completely assembled and/or in an otherwise operational state. The seal testing method 500 therefore may not require partial disassembly or reconfiguring of the rotating structure 20 (or at least its rotating structure components 24-26 and 28) for the testing.

Figure 6:
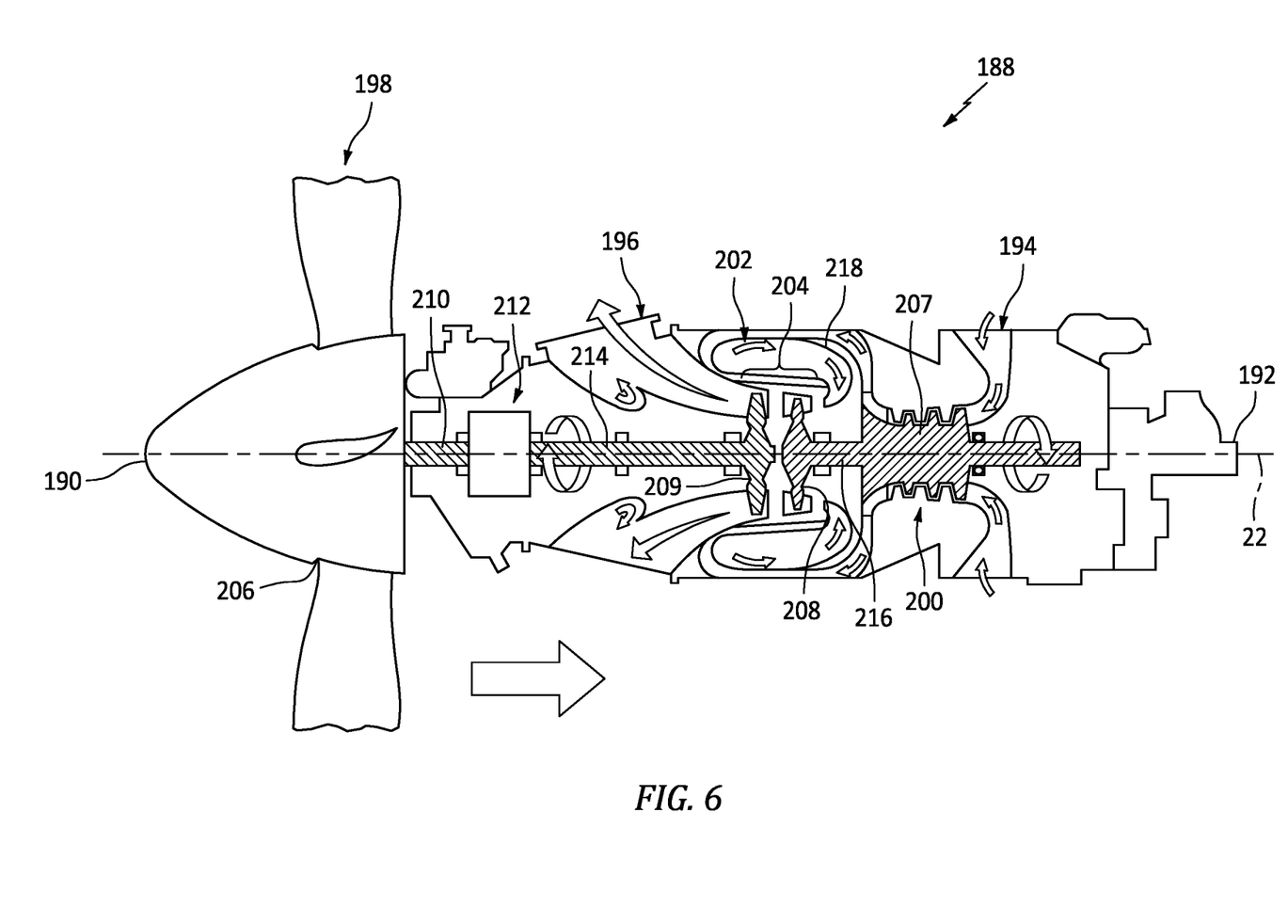
FIG. 6 is a schematic side sectional illustration of a turboprop gas turbine engine.

FIG. 6 is a side sectional illustration of an example of the gas turbine engine with which the rotating structure 20 of FIG. 1 may be included. This gas turbine engine of FIG. 6 is configured as a turboprop gas turbine engine 188. This gas turbine engine 188 extends axially along the rotational axis 22 between a forward end 190 of the gas turbine engine 188 and an aft end 192 of the gas turbine engine 188. The gas turbine engine 188 of FIG. 6 includes an airflow inlet 194, an exhaust 196, a propulsor (e.g., a propeller) section 198, a compressor section 200, a combustion section 202 and a turbine section 204.

The airflow inlet 194 is towards the engine aft end 192, and aft of the gas turbine engine sections 198, 200, 202 and 204. The exhaust 196 is located towards the engine forward end 190, and axially between the propulsor section 198 and the gas turbine engine sections 200, 202 and 204.

The propulsor section 198 includes a propulsor rotor 206. The compressor section 200 includes a compressor rotor 207. The turbine section 204 includes a high pressure turbine (HPT) rotor 208 and a low pressure turbine (LPT) rotor 209, where the LPT rotor 209 may be referred to as a power turbine rotor and/or a free turbine rotor. Each of these gas turbine engine rotors 206-209 includes a plurality of rotor blades arranged circumferentially about and connected to one or more respective rotor disks or hubs. The bladed rotor 24 of FIG. 1 may be configured as or otherwise included as part of any one of the gas turbine engine rotors 207-209, for example.

The propulsor rotor 206 of FIG. 6 is connected to the LPT rotor 209 sequentially through a propulsor shaft 210, an epicyclic geartrain 212 and a low speed shaft 214. The compressor rotor 207 is connected to the HPT rotor 208 through a high speed shaft 216.

During gas turbine engine operation, air enters the gas turbine engine 188 through the airflow inlet 194. This air is directed into a core flowpath which extends sequentially from the airflow inlet 194, through the engine sections 200, 202 and 204 (e.g., an engine core), to the exhaust 196. The air within this core flowpath may be referred to as "core air".

The core air is compressed by the compressor rotor 207 and directed into a combustion chamber of a combustor 218 in the combustion section. Fuel is injected into the combustion chamber and mixed with the compressed core air to provide a fuel-air mixture. This fuel-air mixture is ignited and combustion products thereof flow through and sequentially cause the HPT rotor 208 and the LPT rotor 209 to rotate. The rotation of the HPT rotor 208 drives rotation of the compressor rotor 207 and, thus, compression of air received from the airflow inlet 194. The rotation of the LPT rotor 209 drives rotation of the propulsor rotor 206, which propels air outside of the gas turbine engine 188 in an aft direction to provide forward aircraft thrust.

The rotating structure 20 of FIG. 1 may be included in various gas turbine engines other than the one described above. The rotating structure 20, for example, may be included in a geared gas turbine engine where a gear train connects one or more shafts to one or more rotors in a fan section, a compressor section and/or any other engine section. Alternatively, the rotating structure 20 may be included in a gas turbine engine configured without a gear train; e.g., a direct drive gas turbine engine. The gas turbine engine may be configured with a single spool, with two spools, or with more than two spools. The gas turbine engine may be configured as a turbofan engine, a turbojet engine, a turboprop engine, a turboshaft engine, a propfan engine, a pusher fan engine, an auxiliary power unit (APU) or any other type of gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for testing an annular seal within a gas turbine engine, the method comprising:
mounting a tool to a structure of the gas turbine engine, wherein a first volume is between and is formed by the tool and the structure, the tool extends circumferentially about an axis, the tool includes a base, an inner flange and an outer flange, the base extends radially between the inner flange and the outer flange, the inner flange projects axially out from the base, the inner flange is radially inboard of and axially overlaps the structure, the outer flange projects axially out from the base, and the outer flange is radially outboard of and axially overlaps the structure;
applying a vacuum to the first volume through a conduit, wherein the annular seal is between the first volume and a second volume, and the conduit is connected to the first volume through the tool;
measuring a vacuum pressure within the conduit while the vacuum is applied; and comparing the measured vacuum pressure to a threshold vacuum pressure, wherein a difference between the measured vacuum pressure and the threshold vacuum pressure is indicative of leakage across the annular seal from the second volume to the first volume.

2. The method of claim 1, further comprising determining the annular seal satisfies a specification where the measured vacuum pressure is less than the threshold vacuum pressure.

3. The method of claim 1, further comprising determining the annular seal does not satisfy a specification where the measured vacuum pressure is greater than the threshold vacuum pressure.

4. The method of claim 1, wherein the first volume extends axially between the tool and the structure.

5. The method of claim 1, wherein the first volume extends radially between the tool and the structure.

6. The method of claim 1, wherein the structure comprises a rotor disk.

7. The method of claim 1, wherein the structure comprises a shaft nut.

8. The method of claim 1, wherein the vacuum is applied by a vacuum pump.

9. The method of claim 8, wherein the vacuum pump is operated using compressed air.

10. The method of claim 8, wherein the vacuum pressure is measured at a location outside of the gas turbine engine between the first volume and the vacuum pump.

11. The method of claim 1, wherein the annular seal is installed within the gas turbine engine and ready for operation of the gas turbine engine during the applying of the vacuum and the measuring of the vacuum pressure.

12. A method for testing an annular seal of a gas turbine engine, the method comprising:
providing a structure for the gas turbine engine, the structure rotatable about a rotational axis, the annular seal arranged in situ within and part of the structure, the annular seal configured between a first volume and a second volume, and the annular seal circumscribing the rotational axis;
connecting a tool to the structure;
using the tool to flow across the annular seal from the second volume to the first volume and into a conduit;
measuring a pressure of the gas within the conduit while the gas is flowing across the annular seal; and
comparing the measured pressure to a threshold pressure, wherein a difference between the measured pressure and the threshold pressure is indicative of leakage across the annular seal from the second volume to the first volume.

13. The method of claim 12, further comprising applying a vacuum to the first volume through the conduit to draw the gas across the annular seal from the second volume to the first volume.

14. The method of claim 12, wherein
the first volume is adjacent and outside of the structure; and
the second volume is within the structure.

15. The method of claim 12, further comprising evaluating a condition of the annular seal based on the comparison of the measured pressure to the threshold pressure.

16. A system for testing an annular seal arranged in situ within a structure of a gas turbine engine, the system comprising:
a tool configured to form a first volume with the structure, the annular seal between the first volume and a second volume within the structure;
a conduit fluidly coupled with the first volume through the tool;
a vacuum pump fluidly coupled with the conduit, the vacuum pump configured to draw gas across the annular seal from the second volume to the first volume and into the conduit; and
a pressure measurement device configured to measure a vacuum pressure within the conduit when the vacuum pump draws the gas across the annular seal from the second volume to the first volume and into the conduit, wherein a difference between the measured vacuum pressure and a threshold vacuum pressure is indicative of leakage across the annular seal from the second volume to the first volume;
wherein the tool extends circumferentially about an axis, and the tool includes a base, an inner flange and an outer flange;
wherein the inner flange is connected to an inner end of the base, and the inner flange is configured to axially overlap and seal against the structure; and
wherein the outer flange is connected to an outer end of the base, and the outer flange is configured to axially overlap and seal against the structure.

17. The system of claim 16, further comprising:
a compressed gas source fluidly coupled with the vacuum pump;
the vacuum pump operated by compressed gas received from the compressed gas source.

* * * * *